United States Patent Office 2,765,507 Patented Oct. 9, 1956

2,765,507

SAND CORE AND MOLD COMPOSITION AND METHOD OF MAKING CORES AND MOLDS THEREFROM

Robert J. Wolf, Cleveland, and Robert E. Score, South Euclid, Ohio, assignors to The B. F. Goodrich Company, New York, N. Y., a corporation of New York No Drawing. Application October 1, 1951, Serial No. 249,216

13 Claims. (Cl. 22—193)

This invention relates generally to sand cores and molds suitable for use in the casting of metals and to a composition for use in making same. The invention relates more specifically to a sand core and mold composition containing a particular bonding agent and to a method of making sand cores and molds therefrom.

Numerous materials have been suggested as sand binders in the manufacture of sand cores and molds. Cereal products such as starch, dextrins, flours, sugars, etc. have been utilized for a long time. Linseed oil and other vegetable, animal and synthetic core-oils along with driers, etc. also have been in common use for some time. More recently alkyd resins, urea-aldehyde resins, phenol-aldehyde resins and other thermosetting-type resinous materials have found some acceptance because of the critical shortage of the core-oils. All of these materials, however, produce sand mixes sufficiently deficient in one or more properties that to produce satisfactory cores and molds therefrom it has been necessary to compound mixtures from a number of such materials. Such a process is very expensive and time-consuming and, moreover, the use of such multi-component mixtures is more difficult because of critical control needed in their mixing, handling and baking.

For example, the cereal-type binders produce good strength in the unbaked or "green" core or mold but become rancid on standing, cause sticking of sand to the core box, mold, or pattern, generate gas on baking and do not produce good baked strength properties, the baked cores in particular being not sufficiently resistant to erosion by molten metal during the casting process. Linseed oil and other core-oils yield cores and molds having poor green strength (necessitating the use of cereals) and a rather low baked strength. The core oils, since they cure by oxidation, produce cores and molds having a soft center (poor "bakability") and they are obnoxious in use because of smoke and gases evolved during baking and casting. The alkyd, urea and phenolic resin binders likewise produce cores and molds of poor green strength and even with the addition of cereals do not achieve the green strength of cereals used alone. The phenolics, which are most widely used of the thermosetting resin binders, also attack shellac and other protective coatings commonly used on wooden core boxes, molds and patterns; they cause serious dermatitis in certain workers because of their free formaldehyde content; they require careful order or sequence of mixing together with critical control of temperature and time of mixing; they are sensitive to moisture losses during or after mixing; they have poor storage stability, particularly in sand mixes at the temperatures usually obtaining in a foundry, and they migrate to the surface of a mold during jolting so as to produce a core or mold having a soft interior. Moreover, all of the known binder materials require baking for 1 to 2 hours or more at high temperatures of 350 to 450° F. or more to reach optimum strength.

A sand core and mold composition should have certain other properties not readily obtainable with known binding materials. For example, a green core must be formed which is non-sticky in nature and in which the surface grains of sand are firmly bound in order to facilitate removal from the core box, mold or pattern and to produce a casting having as smooth a surface as possible. Yet another so-called "green property" is "blowability" or the ability of the mix to be blown into a core box, mold or on a pattern with the production of a firm green core or mold. "Blowability" is the ratio, expressed in percent, of the green hardness developed by a blown core or mold to the same properties of a properly rammed core or mold of the same mix, the higher the ratio the more adaptable the mix is believed to be for processes involving blowing or shaking such as in the shell molding process. Moreover, both the green and baked core or mold must be permeable to gases normally evolved in the baking and casting steps (this property is known as "green" or "baked permeability") in order to produce smooth cores and molds and prevent formation of bubbles, blow holes and other defects in the finished casting. Another essential baked property is "collapsibility" or the ability of the core to yield when the cooling metal solidifies and shrinks in order to prevent shrinkage strains and "hot tear" in the finished casting and to facilitate "shake-out" of core sand from the finished casting. Since no known binder material possesses all of these properties to a sufficient degree each foundry has to tailor-make and carefully adjust the composition of the sand core or mold mix for almost every casting application.

It is an object of this invention therefore to provide a sand core and mold composition adapted to the production of cores and molds free from the above-described undesirable properties and which is easily converted to sand molds and cores of excellent properties in a short baking cycle at moderate temperatures. Another object is to provide an improved method of making sand molds and cores. Still further objects will appear in the description which is to follow.

We have discovered that excellent sand core and mold compositions are obtained by combining foundry sand with a binding agent which is a polymer of an acrylic acid or an ammonium salt thereof. The resulting composition without further additives, except moisture and optionally a small amount of a lubricant such as kerosene, produces cores and molds of extremely high green strength, baked strength, hardness and collapsibility, coupled with excellent permeability and excellent surface smoothness. Cores and molds made from such a composition are highly useful in the casting of iron, steel, cast iron, grey iron, malleable iron, copper, bronze, aluminum, magnesium and other metals and alloys and particularly in the casting of iron and steel and the light metals such as magnesium, to close tolerances where intricate shapes must be maintained. The sand core composition also is useful in the so-called shell-molding process wherein the sand composition is blown, rammed or shaken into place on a metal pattern or mold (which is sometimes heated) and allowed to stand until a thin layer thereof has hardened on the pattern after which the excess is removed leaving a hollow core or mold of sufficient strength when further baked and suitably supported, to receive the molten metal.

The binder agent of this invention is defined generically as a water-soluble polymer of an acrylic acid or an ammonium or amine salt thereof. Specific materials included within this class are polyacrylic acid, poly-methacrylic acid, poly-alpha-chloroacrylic acid, poly-alpha-cyanoacrylic acid, a polymer of a mixture of acrylic acids such as an interpolymer of acrylic and methacrylic acids, interpolymers of acrylic acids with lesser amounts of other polymerizable compounds, ammonium polyacrylate, ammonium polymethacrylate, the ethyl amine or propyl amine salt of polyacrylic acid, the ammonium salt of an acrylic acid methacrylic acid interpolymer and others.

The neutralization of substantially all the carboxyl groups of an acrylic acid polymer by sodium, potassium, calcium or other monovalent or metal salt radicals has been found substantially to destroy the adhesiveness of the polymer in a sand mix resulting in cores and molds of poor green and baked strength. However, partial neutralization of an acrylic acid polymer by sodium or potassium hydroxides as long as sufficient carboxyl groups or ammonium or amine salt groups are present to lend adhesiveness to the binder is not deleterious. Polyacrylic acid, interpolymers of acrylic acid with lesser amount of vinyl acetate, styrene or the like, and ammonium polyacrylate or an ammonium salt of such an interpolymer are preferred, however, because of their lower cost, ready availability and ability to produce stronger cores and molds. When using metal core boxes, molds and patterns, it is especially preferred to utilize ammonium polyacrylate or other ammonium salt of an acrylic acid polymer of substantially 100% neutralization, because of the possibility of metal corrosion.

As mentioned above, the acrylic acid polymer or ammonium salt thereof may be modified by the incorporation of up to 50% by weight on the acid of suitable comonomers during polymerization. For example, acrylic acid, methacrylic acid or other acrylic acid may be interpolymerized with up to 50% by weight of styrene to form interpolymers which are readily swellable or soluble in water and which when converted to a salt such as the ammonium salt are highly soluble in water. Similarly interpolymers of acrylic acid, methacrylic acid or other acrylic acid with up to 20% by weight of ethyl acrylate or other alkyl acrylate or alkyl alkacrylate ester or up to 30% by weight of vinyl acetate or other vinyl aliphatic ester are also soluble in water as are copolymers with up to 50% of these monomers in the form of their ammonium or amine salts. Copolymers or multi-component interpolymers of acrylic acid, methacrylic acid or other acrylic acid with substantial proportions of vinyl chloride, vinylidene chloride, acrylonitrile, acrylic amides such as acrylamide, with vinyl ketones and vinyl ethers such as vinyl methyl ketone and vinyl methyl ether, with maleic acid or anhydride, with alkyl maleate esters, with mixtures of styrene and maleic acid or anhydride, with butadiene-1,3, isoprene, isobutylene and others are produced which are either readily soluble in or swellable by water and which are readily soluble when converted to an ammonium salt.

The polyacrylic bonding agent may be further modified by blending with alcoholic polymers such as polyvinyl alcohol, partial polyvinyl acetals, polyallyl alcohol, polymethallyl alcohol and others or with small amounts of saturated polyhydric alcohols to form compatible mixtures which when heated suffer transesterification or cross esterification and consequent insolubilization. Such a mixture in a sand core or mold mix reacts upon baking to form a core or mold of considerable strength.

The acrylic bonding agents of this invention are produced by polymerization of the acryic acid or its salt in any conventional manner. For example, acrylic acid may be polymerized in water solution at 0 to 125° C. or higher in the presence of a water-soluble peroxygen catalyst such as potassium persulfate to produce an aqueous polyacrylic acid solution useful as such in the preparation of sand core or mold compositions or which may be neutralized with ammonia to form a solution of ammonium polyacrylate. By such a process it is possible to produce solutions ranging up to 20 to 30% or more by weight of polymer. Acrylic acid may also be polymerized in an organic solvent, preferably one in which the polymer is insoluble, such as hexane, in a closed vessel or under reflux utilizing an oil-soluble peroxygen catalyst such as caprylyl peroxide and others. In the latter case, polyacrylic acid is obtained as a fine granular precipitate which may be utilized as such, converted to the ammonium salt or dissolved in water before use. In general, aqueous solution polymerization produces lower molecular weight polymers than the organic solvent-nonsolvent process, and which polymers produce aqueous solutions of lower viscosity for a given solids content. Such low molecular weight polymers are not disadvantageous for they produce very strong sand cores and molds.

Any sand may be utilized in the sand core and mold composition of this invention but it is generally preferred to use a clean, washed round- or sub-angular grained silica base sand of the general type known as foundry sand. Such sand is available in a wide range of particle sizes containing particles ranging from about 30 to 270 mesh or finer, U. S. series. Such sands usually contain a range of particle sizes and are given a fineness number based on their particle size distribution, which number is designated as "AFS Fineness No.—." In general the coarser the particle size of the sand the higher will be baked strength, baked permeability, baked indentation or "scratch" hardness, and blowability while with the binder of this invention increased sand fineness appears to favor higher green strength and better collapsibility. However, since the sand mix compositions of this invention produce cores and molds of very high strength with any clean foundry sand the controlling factors in the selection of the sand will be the temperature of the metal poured and the smoothness desired in the casting. In general, the hotter the metal the higher the baked permeability must be in order to dissipate the increased volume of gases generated. Coarser grained sand tends to produce more porous cores while finer sands, of course, favor smooth finish. Consequently the finest grained sand favoring the production of cores having the requisite permeability is usually selected. The binders of this invention, however, have relatively little effect on the base permeability of a given sand over a wide range of binder concentrations so that, in general, finer sands may be utilized than with other binder materials. In addition to naturally-occurring foundry sand it is sometimes advantageous for special purposes to utilize artificially-prepared siliceous materials such as silica flour and other special additives such as wood flour, sawdust, fire clays, bentonites, straw, hay and other fillers, boric acid, iron oxide sulfuric acid and others.

The amount of the acrylic acid polymer or salt thereof to be utilized as a binder may be varied considerably. As little as 0.15% based on the weight of dry sand produces satisfactory core or mold mixes for some purposes while in others amounts as large as 3% or more may be utilized. In general from 0.25 to 1.5% will be found satisfactory for most purposes with 0.30 to 1.0% being particularly preferred.

In addition to the sand and bonding agent the only other ingredient required in the sand mix of this invention is water. In general moisture is required to impart moldability to the mix and for the development of satisfactory green strength. With the bonding agent of this invention as the amount of total moisture is increased the moldability and green strength are rapidly increased. Satisfactory green strength, moldability and surface finish are obtained in the range of 1.0 to 6% or more total moisture. The baked properties, however, of the sand mix of this invention are practically constant over a range of 2 to 6% moisture when using up to 1.5% binder. Since too high total moisture content unduly lengthens the baking cycle it is particularly preferred to maintain the total moisture content of the mix in the range of 2.5 to 5.0%.

Although not absolutely required it is generally advantageous in production line work to add up to 0.1 or 2.0%, preferably 0.25 to 0.75% of a lubricant such as kerosene, light fuel oil, and other somewhat volatile oily materials in order to insure quick release of the core or mold from the core box, mold or pattern. Most other ingredients conventionally utilized in sand core and mold compositions do not contribute their conventional properties to the compositions of this invention. In some instances, notably cereals and iron oxide, they are actually deleterious and are therefore not recommended.

In the practice of this invention the dry sand and the acrylic polymer bonding agent may be mixed in any conventional manner. The dry acrylic acid polymer in finely-divided form may be mixed with dry sand to form a composition to which only the correct amount of water need be added before use. Such a dry mixture may be stored almost indefinitely without deleterious effects since the acrylic polymer itself is very stable. Polymeric acrylic acids, their ammonium salts, and the above-described modified forms thereof, are highly water-soluble and are usually supplied as water solutions containing from 10 to 35% by weight of polymer; hence it is preferred to mix the dry sand with an aqueous solution of the bonding agent. Moreover, since these polymer solutions may be diluted almost indefinitely without precipitation, the binder solution may be diluted to the correct strength to yield directly on admixture with sand a core or mold mix of proper total moisture content.

Intermixture of the sand and acrylic binder may be performed by hand, in an internal mixer, in a paddle-type mixer or in any of the low and high speed mulling machines conventionally utilized in preparing such compositions. No particular care as to order of mixing or of time and temperature of mixing need be exercised since the binding agent of this invention is exceptionally stable. The intermixture of the ingredients of the sand core and mold compositions of this invention may be accomplished by adding the ingredients one at a time, or in any order, or all at once, without effect on core or mold properties with the latter procedure being preferred because of speed and economy. An efficient internal mixer or mulling machine produces a homogeneous composition of this invention in a very short time, usually in from 1 to 2 or up to 5 minutes or less. The resulting green core or mold mix may be stored indefinitely without development of rancidity and may suffer substantial dehydration without degradation of green or baked properties since the binder of this invention is not as sensitive to variations in moisture content as are core oils, cereals and phenolics, etc. Any moisture lost during such storage can be easily replaced before use, if desired.

The resulting sand mix is then shaped by ramming, jolting, blowing or any combination thereof into a suitable core or mold box, or on a pattern or other shaping device or by shaking or blowing into a hot mold. Cores of difficult or intricate shape may be made in halves and pasted together with a solution of binder or other adhesive. When compacted or shaped in such a manner the core or mold is easily removed from the shaping device and is found to be hard and of such high green strength that it is easily handled in subsequent operations and is especially adapted to use as a green or unbaked core. Upon storage the green cores formed by the method of this invention become progressively harder and stronger; they may therefore be made in quantity and stored indefinitely before baking without regard to humidity conditions. If desired, a light spray of water or preferably of a dilute solution of binder may be applied to the green core just before baking to further increase the surface hardness.

The operation in which the green core is converted to a hard, dry condition is essentially a dehydrating operation and not a thermal reactive one as is the case with core oils and core resins. The core may be dried at room temperature and will be found to possess properties in every case as good and in many cases slightly superior to the properties of a similar core baked at elevated temperatures (as is more conventional in foundry practice) or to cores prepared with the same or much larger proportions of other bonding agents. In fact it is preferable to allow the cores to air dry at room temperature for a short period before oven baking in order to allow them to harden slightly and thus insure against damage in subsequent handling. Since air drying is undesirably slow, drying or baking of the core may be carried out in an air oven or by dielectric heat, the latter being especially preferred for the reason that the use of dielectric heat eliminates chances of over-baking. Air oven drying is satisfactorily accomplished in from 5 to 60 minutes at temperatures of 100 to 450° F. or more and preferably in 10 to 30 minutes at 200 to 350° F. Since other core and mold binder materials require much longer baking cycles at higher temperatures the use of the sand core and mold composition of this invention results in a great saving in fuel and oven capacity.

The baked core or mold of this invention possesses excellent hot strength and hardness so that it is readily handled upon removal from the oven and upon cooling shows a considerable increase in hardness. The hardness of the baked core, moreover, does not change upon prolonged storage under humid conditions. A slight decrease in baked tensile strength is noted in the first 20 to 40 hours of storage under humid conditions but is constant thereafter.

After the molten metal has been poured in and cooled the core or mold of this invention is easily disintegrated or shaken-out by brushing, blowing, tumbling, pounding or flushing and the casting is ready for use or machining and finishing. The sand thus obtained from the used cores and molds may be reused, for many purposes, simply by remoistening and/or addition of a small amount of make-up binder solution. A large proportion of the binder remaining in the used sand can be removed by washing and the binder can be completely removed by burning and washing processes now in common use in the foundry industry for the reclaiming of sand.

This invention is more fully described in the following specific examples with reference to the preparation and use of several representative bonding agents of this invention as applied to the production of cores and molds from several representative foundry sands. The examples are intended to be illustrative only and not as limiting the invention. All parts are by weight.

EXAMPLE 1

To an aqueous solution containing 25% by weight of monomeric acrylic acid there is added 1% on the acrylic acid of potassium persulfate. The resulting solution is maintained at 120° C. for 10 hrs. at which point polymerization is complete with the formation of a low viscosity solution containing above 20% by weight of polyacrylic acid. No. 52.5 AFS—N. J. silica base foundry sand is dried in air at 220 to 230° F. for several hours and is then allowed to cool to room temperature. The dry sand is then weighed into a Simpson mixer, distributed evenly over the muller pan and then mixed for 2 minutes. A sufficient quantity of the above polyacrylic acid solution to constitute 0.5% by weight on the dry sand and a sufficient quantity of temper water (less than in the binder solution) to constitute 3.5% on the sand are then measured out and about half of the latter added to the former to make a diluted binder solution. The dilute binder solution is then charged to the mixer, the container rinsed with the remaining temper water and the rinsings also added to the mixer. The mixer is then closed and mixing continued for 5 minutes. There is then added 0.5% on the sand of kerosene and mixing continued for an additional 2 minutes. A uniform, homogeneously damp mixture is thus obtained after only 9 minutes total mixing. A green core is made by placing the correct amount of mix in a core box or mold and using three blows of a Dietert rammer fitted with the tensile specimen head. The green core is found to have 0.5 lb./sq. in. green compressive strength. After baking in an air oven for 30 minutes at about 300° F. the resultant baked core is found to have a baked tensile strength in excess of 150 lbs./sq. in. and baked indentation (or scratch) hardness in excess of 80. A baked core having these properties is classified as a hard core.

EXAMPLE 2

A polyacrylic acid solution similar to that of Example 1 is neutralized with ammonia to produce a solution having a viscosity of 1200 centipoises containing 23.9% total solids (as ammonium polyacrylate). This solution together in each case with sufficient water to total 3.5% moisture and 0.5% kerosene are added to silica base foundry sand in a low speed muller of the Simpson or Clearfield types. In 5 to 10 minutes the batch is moist, homogeneous and non-sticky in nature. By contrast most other sand core binder materials require 10 or even as much as 30 minutes of mulling time to reach homogeneity. Green cores are produced from the above-described mixtures and are subsequently baked at various times and temperatures to determine optimum properties. Table I, below, lists the green and baked properties of cores made from several foundry sands of widely differing particle sizes at ammonium polyacrylate levels of 0.3, 0.5, 0.75 and 1.0% calculated on the dry basis.

The baked permeability values shown in Table I are exceedingly high for cores having the strength and hardness therein shown. They are even more surprising when compared against the base permeability values of the three sands utilized as follows:

*Table II*

| Sand No. | 52.5 AFS—N. J. | 95.4 AFS—N. J. | 162.5 AFS—N. J. |
|---|---|---|---|
| Baked Permeability (1% Binder) | 167 | 64.0 | 28.2 |
| Base Permeability | 160 | 57.5 | 24.0 |

It is to be observed that the permeability of the baked core is relatively little affected by the binder up to the maximum concentration tested. Such high permeability values greatly simplify venting problems and greatly reduce casting defects due to entrapment of gases, etc.

The most outstanding property of the cores of Example 2 is their collapsibility of 100 to 200 seconds at 1000° F. and 40 to 80 seconds at 1500° F. No other binder materials are known which approach these values. Collapsibility values of the cores of Example 2 at 2500° F. (the temperature conventionally utilized in collapsibility measurements) are of necessity even much lower than those at 1000 to 1500° F. Collapsibility values for synthetic resin binders are generally lower than for cereals and core oils. If the collapsibility of a phenolic binder is taken as 1.0 the collapsibility of urea-aldehyde binders is 0.5 and ammonium polyacrylate is 0.48. The significance in low collapsibility values lies in the prevention of strains or strain-cracks (known as hot tear) when the molten metal solidifies and begins to contract upon cooling and also in the necessity for a core or mold to be easily disintegrated after the metal has cooled in order to facilitate "shake-out". The sand core and mold compositions thus not only produce cores and molds of high green and baked strength so as to facilitate handling but also provide a means of producing castings free from flaws and of true dimensions with a great saving in time, labor and power in the shake-out and clean-up steps.

*Table I*

| Sand No. | No. 52.5 AFS—N. J. | | | | No. 94.5 AFS—N. J. | | | | No. 162.5 AFS—N. J. | | | |
|---|---|---|---|---|---|---|---|---|---|---|---|---|
| Parts Sand | 3,000 | | | | 3,000 | | | | 3,000 | | | |
| Parts Kerosene | 15 | | | | 15 | | | | 15 | | | |
| Water added, parts | 81.4 | 62.5 | 38.3 | 15.0 | 81.4 | 62.5 | 38.3 | 15.0 | ---- | 62.5 | 38.3 | 15.0 |
| Ammonium Polyacrylate, parts | 9 | 15 | 22.5 | 30 | 9 | 15 | 22.5 | 30 | ---- | 15 | 22.5 | 30 |
| Green Compressive Strength, lbs./sq. in. | 0.55 | 0.45 | 0.40 | 0.40 | 1.05 | 0.95 | 0.88 | 0.90 | ---- | 1.70 | 1.60 | 1.60 |
| Green Indentation, Hardness | | | | | 59 | 55 | 55 | 54 | ---- | 68 | 68 | 68 |
| Optimum Cure, minutes/° F. | 10/250 | 30/250 | 18/250 | 40/250 | 20/300 | 20/300 | 20/300 | 20/300 | ---- | 15/300 | 20/300 | 15/300 |
| Baked Tensile Strength, lbs./sq. in. | 99 | 175 | 261 | 276 | 48 | 113 | 186 | 219 | ---- | 38 | 99 | 129 |
| Baked Indentation, Hardness | 83 | 94 | 98 | 98 | 70 | 87 | 93 | 95 | ---- | 74 | 83 | 89 |
| Collapsibility[1] @ 50 lbs./sq. in.: | | | | | | | | | | | | |
| Secs. @ 1,000° F. | 177 | 159 | 137 | 132 | 113 | 186 | 138 | 133 | ---- | 114 | 136 | 138 |
| Secs. @ 1,500° F. | 80.7 | 77.7 | 73.4 | 71.0 | 41 | 85 | 79 | 75 | ---- | 56.1 | 79 | 81 |
| Baked Permeability[1] | 200 | 181 | 164 | 167 | 70 | 66 | 63 | 64 | ---- | 28 | 28 | 28 |
| Blowability, Percent, Dietert No. 693 Tester | 70 | 73 | 70 | 63 | 62 | 68 | 62 | 56 | ---- | 59 | 56 | 55 |

[1] Average of at least 5 determinations using core baked 30 minutes @ 300° F.

Comparison of the data shown in Table I with the best published data on cores made with cereals, core oils and phenolic resins reveals that the cores of Example 2 are as good or much better in every property. For example, the sand mix compositions of Example 2 develop high green hardness values of 50 to 70 which is very nearly 75% of the hardness of the baked core. The green compressive strengths shown in Table I vary from 0.45 to 1.70 lbs./sq. in. while those of core oils such as linseed oil and phenolics seldom develop, without cereal, green compressive strengths over 0.30 to 0.40 lbs./sq. in. and with maximum cereal loadings over 0.5 to 0.60. In fact, cereals until now the best known binder for developing green strength, when used alone develop green strengths of only 0.60 to 0.70 lbs./sq. in. The green cores of this example show a gradual increase in hardness and strength upon storage at 60% relative humidity.

The baked properties of the cores of Example 2 are even more impressive when compared with those of other sand mix compositions. For example, the baked tensile strengths of 175 to 276 lbs./sq. in. obtained with 0.5 to 1.0% binder with sands of AFS fineness No. from 50 to 100 are extremely high for such small quantities of binder, amounts of core oil or phenolics ranging from 1.5 to 4% or more being required to develop with the same sands over 175 lbs./sq. in. baked strength. The baked indentation hardness values, which are a measure of the ability of the baked core or mold to withstand erosion by the molten metal are shown in Table I to be uniformly high in the range of 75 to 100 for the sands tested, even when using as little as 0.3% of the ammonium polyacrylate binder. Moreover, the cores and molds are uniformly hard throughout and show no signs of binder migration.

Yet another outstanding property of the sand core compositions of Example 2 will be observed in the baking cycles shown in Table I. Optimum cure is seen to be 10 to 40 minutes at 250° F. or 10 to 30 minutes at 300° F. In contrast, the optimum baking cycles with sand mixes containing core oils and phenolics (with or without cereals) range from 30 to 120 minutes or more at 300 to 375° F. to 1 to 2 hours or more at 400 to 450° F. The ability to be baked in 1/3 to 1/2 less time and at about 100 to 200° F. lower than cores containing phenolics and in 3/4 less time than those containing core oils results in a great saving in fuel, labor and oven capacity and especially adapts the sand mix of this invention to the shell-molding process.

The blowability values shown in Table I indicate the sand mix, if total moisture content is reduced to 1.5 to 2.5%, would be very satisfactory for manufacture of cores and molds by blowing processes. Actual casting tests on blown cores reveal, however, that their properties are even better than indicated by blowability values.

Castings of iron, grey iron, steel, aluminum, copper, bronze and various alloys are prepared by conventional founding practice using cores prepared as in Example 2 and having special shapes and designs adapted to favor hot metal erosion, hot tear and other defects in the finished castings. The resulting castings, however, are smooth, of true dimensions and free of surface defects, shrinkage strains and "hot tear". Shake-out and clean-up time is greatly reduced as compared to castings made with known core sand mixes. In many instances the castings require only polishing and grinding to be ready for use.

EXAMPLE 3

A solution of polymethacrylic acid containing 20% total solids is used in the manner of the foregoing examples to produce sand cores and molds. Amounts from 0.25 to 1.50% dry weight of polymethacrylic acid or ammonium polymethacrylate produces cores having green and baked properties in every way comparable to those of polyacrylic acid or ammonium polyacrylate and in some respects slightly superior. Iron, aluminum and bronze castings made with these cores are smooth and free of defects and are of true dimensions.

EXAMPLE 4

A miscible mixture of hexane containing up to 10% acrylic acid is prepared and 0.5% of an oil-soluble catalyst such as caprylyl peroxide added thereto. The resulting solution is refluxed until precipitation of finely-divided polymer is complete. The resulting polymer is then filtered off and freed of solvent by warming in air. The product is finely-divided polyacrylic acid of higher molecular weight than that of Example 1 but which nevertheless is soluble in water and produces a clear solution slightly more viscous than the latter. The dry polymer is mixed with foundry sand in amounts of 0.25 to 1.5% dry basis, to produce a dry sand mix which when moistened with 2 to 6% water forms cores and molds of excellent green and baked strength. An aqueous solution of the hexane-polymerized polyacrylic acid or an ammonia-neutralized solution thereof is utilized in the manner of Examples 1 and 2 to produce sand cores and molds of properties in some respects superior even to those of Example 2. The solutions of Examples 1 and 2, however, because of their greater fluidity for a given total solids content are easier to handle and require less mixing time.

EXAMPLE 5

In a similar fashion many modified forms of the acrylic acid polymer binder may be utilized. For example, test specimens are rammed by standard procedure and baked 30 minutes at 300° F. from sand mixtures containing 0.5% by weight of the following binder materials:

(1) Acrylic acid—vinyl acetate copolymer containing 25% vinyl acetate-completely neutralized with ammonia.
(2) Acrylic acid-vinyl acetate copolymer containing 40% vinyl acetate, 100% neutralized with ammonia.
(3) Acrylic acid styrene copolymer containing 25% styrene-completely neutralized by ammonia.
(4) Polyacrylic acid similar to Example 1, completely reacted with ethyl amine.
(5) Similar to (4) but completely reacted with isopropylamine.
(6) Similar to (4) but neutralized 50% with NaOH and 50% with ammonia.
(7) Similar to (4) but 100% neutralized with NaOH.
(8) 50/50 mixture of polyacrylic acid and polyvinyl alcohol.
(9) Polyacrylic acid (control).
(10) Ammonium polyacrylate—control.

The baked tensile strength and hardness of the resulting specimens are as follows:

| Polymer | Tensile Strength | Hardness |
|---|---|---|
| (1) | 177 | 92-95 |
| (2) | 160 | 90-95 |
| (3) | 146 | 90-93 |
| (4) | 92 | 90-95 |
| (5) | 85 | 88-95 |
| (6) | 135 | 85-95 |
| (7) | 53 | ---- |
| (8) | 145 | 90-95 |
| (9) (control) | 155 | 90-95 |
| (10) (control) | 160 | 93-97 |

From the foregoing data it is seen that neutralization of the acrylic acid polymer with up to 50% sodium hydroxide does not greatly reduce the baked properties of the core but when 100% converted to the sodium salt produce very weak cores. The lower alkyl amine salts do not produce as strong a core as the ammonium salt but are almost twice as efficient as sodium polyacrylate. Soluble copolymers in the form of their more soluble ammonium salts containing from 25 to 40% of vinyl acetate or styrene are as good or better than polyacrylic acid or ammonium polyacrylate. Diluting the polyacrylic acid with as much as 50% of a compatible water-soluble resinous material such as polyvinyl alcohol produces only a small reduction in core properties. Possibly heating to higher temperatures of 400 to 450° F. would cause the polyacrylic acid and polyvinyl alcohol to transesterify and result in higher core strength.

EXAMPLE 6

The addition of cereals to sand core and mold mixes to increase green strength and decrease collapsibility time and iron oxide to increase collapsibility time are well recognized practices. Addition of from 0.5 to 1.5% of a cereal product such as the material known as "Mogul" to a core sand mix containing 0.75% of ammonium polyacrylate increases collapsibility time from 79 seconds to 425 seconds at 1500° F. under 50 lbs./sq. in. pressure, decreases baked strength by as much as 60 lbs./sq. in., decreases baked indentation hardness by as much as 25 units, and has very little effect on green compressive strength. Addition of 0.5 to 2.0% of iron oxide to a similar mix actually decreases rather than increases the collapsibility time.

The sand mix compositions of this invention are remarkably insensitive to variations in baking technique and moisture content of the original mix and produce cores which are relatively harder than conventional binders over a wide range of binder concentration. For example, cores baked for 120 minutes at the indicated temperatures have the following properties:

*Table III*

| Baking temperature, ° F. | Ammonium Polyacrylate | Linseed Oil | Soybean Oil | Phenolic |
|---|---|---|---|---|
| 250 Baked tensile strength (p. s. i.) | 209 | ---- | ---- | ---- |
| 300 do | 195 | ---- | ---- | 110 |
| 350 do | 190 | ---- | ---- | 105 |
| 375 do | ---- | 220 | 175 | 105 |
| 400 do | 160 | 175 | 200 | 90 |
| 450 do | ---- | 130 | 110 | 75 |
| Percent loss | 23 | 41 | 37 | 32 |
| Temperature range ° F | 150 | 75 | 75 | 150 |

EXAMPLE 7

Note that the ammonium polyacrylate bonded cores show appreciably lower strength loss over a temperature range equal to or greater than that used for several other binders.

The relative insensitivity of an acrylic bonded core to overbaking is shown by the following data:

*Table IV*

| | | Ammonium Polyacrylate | Linseed Oil |
|---|---|---|---|
| Base sand number | | 52.5 AFS | 56 AFS |
| Binder concentration | | 1.0 | 1.0 |
| Moisture, percent | | 3.5 | 7.2 |
| Baking temperature, °F | | 400 | 450 |
| Baking time, minutes: | | | |
| 10 | Baked tensile strength (p. s. i.) | 255 | ---- |
| 15 | do | 270 | 10 |
| 30 | do | 255 | 40 |
| 45 | do | 230 | 160 |
| 60 | do | 225 | 178 |
| 90 | do | 222 | 150 |
| 120 | do | 220 | 118 |
| Percent loss | | 18 | 38 |
| Time of overbaking, minutes | | 105 | 60 |

The sand mix composition containing an acrylic binder is likewise insentitive to variation in the moisture content of the original mix. For example, compositions containing ammonium polyacrylate (0.5%) or linseed oil (1%) and from 2 to 6% moisture content are compared as to variation in properties as follows:

*Table V*

| | | Ammonium Polyacrylate | Linseed Oil |
|---|---|---|---|
| Sand Number | | 52.5 AFS | 56.0 AFS |
| Baking temp., °F | | 300 | 350 |
| Baking time, minutes | | 30 | 60 |
| Moisture conc. (percent): | | | |
| 2.0 | Baked tensile strength (p. s. i.) | 155 | 240 |
| 3.0 | do | 165 | 225 |
| 4.0 | do | 165 | 225 |
| 5.0 | do | 165 | 250 |
| 6.0 | do | 165 | 275 |

When compared on the basis of equal binder concentration and at the same baking temperature the ammonium polyacrylate bonded cores show a considerable advantage in tensile strength and hardness over linseed oil or other core oil binders, as follows:

*Table VI*

| | Ammonium Polyacrylate | | Linseed Oil | |
|---|---|---|---|---|
| Sand number | 52.5 AFS | | 56.0 AFS | |
| Baking temp., °F | 350 | | 350 | |
| Baking time, minutes | 30 | | 90 | |
| | Baked tensile | Hardness | Baked tensile | Hardness |
| Binder conc. (percent): | | | | |
| 2.0 | >350 | 98 | >350 | 85 |
| 1.0 | 270 | 98 | 260 | 72 |
| 0.75 | 215 | 93 | 155 | 43 |
| 0.50 | 155 | 91 | 100 | 30 |
| 0.30 | 80 | 80 | 80 | 27 |

The advantage in hardness is evident even at 2% binder concentration and the advantage in both tensile strength and hardness is even more marked in the practical range of binder concentration of 0.5 to 1.0%.

In summary, it is seen that the sand core and mold compositions and method employing them of this invention have the following advantages over known methods and compositions:

(*1*) *Mixing.*—May be performed in conventional mixing equipment and cores formed with conventional tools and blowers. No special precautions as to mixing order or in handling or storage are required. The physical properties of the baked cores are not sensitive to changes in the moisture content of sand mix. The resulting mix may be stored for long periods of time with only the addition of makeup moisture.

(*2*) *Green cores.*—Are of uniformly high strength and become increasingly strong upon air drying during storage. The core is smooth and presents a hydrophilic surface adapted to receive various proprietary washes or surface coatings.

(*3*) *Baking cycle.*—Baking time is reduced by ⅓ to ½ and baking temperatures by 100 to 200° F. as compared to that of thermosetting resins and by ¾ or more as compared to core oils because baking is a simple dehydration operation, neither oxidation nor polymerization being required to set the binder. The mix is very resistant to the effects of overbaking, and is insensitive to variations in baking temperature. Noxious smoke and fumes are not evolved either during baking or during pouring.

(*4*) *Baked properties.*—Are as good or better than cores or molds made with known binder materials. The cores or molds exhibit uniformly high hardness throughout the body and retain their strength even at the pouring temperatures encountered in cast iron practice, yet exhibit far superior collapsibility and ease of removal on shake out than is obtainable with known sand mixes. The baked permeability of the cores and molds is the same or slightly higher than the base permeability of the unbonded sand over the useful range of binder content.

(*5*) *Sand reuse.*—A large portion of the polyacrylic binder is removed by washing and in any case the binder is completely removed by the burning and washing processes conventional in founding practice. Sand may be reused in many cases simply by remoistening and/or addition of makeup binder.

Although we have disclosed certain preferred manners of performing our invention, we do not thereby desire or intend to limit ourselves solely thereto, for the precise proportions of the materials utilized may be varied and equivalent chemical materials may be employed, if desired, without departing from the spirit and scope of the invention as defined in the appended claims.

We claim:

1. A sand mold and core composition suitable for use in the casting of metals consisting essentially of a foundry sand containing from about 0.15 to about 3% by weight of a water-soluble binder material selected from the class consisting of polymers of acrylic acids, their ammonium salts and their monoamine salts.

2. A sand mold and core composition suitable for use in the casting of metals consisting essentially of a foundry sand and from about 0.15 to about 3% by weight of a water-soluble polymer of an acrylic acid.

3. A composition as defined in claim 2 in which the binder is an aqueous solution of polyacrylic acid.

4. A sand mold and core composition suitable for use in the casting of metals consisting essentially of a foundry sand and as a binder therefor an aqueous solution of ammonium polyacrylate.

5. A composition as defined in claim 1 in which the binder is an aqueous solution of polymethacrylic acid.

6. A composition as defined in claim 1 in which the binder is an aqueous solution of the ammonium salt of a copolymer of acrylic acid and up to 50% by weight of vinyl acetate.

7. A composition as defined in claim 1 in which the binder is an aqueous solution of the ammonium salt of a copolymer of acrylic acid and up to 50% by weight of styrene.

8. The method of making sand molds and cores suitable for use in the casting of metals comprising preparing a mixture consisting essentially of foundry sand, water and from about 0.15 to about 3% by weight based on the sand of polyacrylic acid to form a damp moldable mixture, shaping said mixture and heating said shaped mixture at a temperature of 200 to 350° F. to drive off water and harden said shaped mixture.

9. The method of making sand molds and cores suitable for use in the casting of metals comprising preparing a mixture consisting essentially of foundry sand, water and from about 0.15 to about 3% by weight based on the sand of ammonium polyacrylate to form a damp moldable mixture, shaping said mixture and heating said shaped mixture at a temperature of 200 to 350° F. to drive off water and harden said shaped mixture.

10. The method of making sand mold cores suitable for use in the casting of metals comprising preparing a mixture consisting essentially of a foundry sand, water and from about 0.1 to about 3% by weight based on the sand of a binder material selected from the class consisting of polymers of acrylic acids, their ammonium salts and their monoamine salts and shaping the mixture to form a hardened sand core or mold.

11. The method of making sand molds and cores suitable for use in the casting of metals comprising preparing a mixture consisting essentially of foundry sand, water and from about 0.15 to about 3% by weight based on the sand of a material selected from the class consisting of polymers of acrylic acids, their ammonium salts and their monoamine salts, shaping the mixture and heating the shaped mixture at a temperature of 100 to 450° F. to harden the said shaped mixture.

12. A sand core for use in casting metals consisting essentially of foundry sand, from about 0.15 to about 3% by weight of a water-soluble material selected from the class consisting of polymers of acrylic acids, their ammonium salts and their monoamine salts, the said core being heat treated to remove moisture therefrom and to harden said core.

13. The method of making sand molds and cores suitable for use in the casting of metals comprising preparing a mixture consisting essentially of a foundry sand, water and the ammonium salt of a copolymer of acrylic acid and vinyl acetate in which the vinyl acetate content ranges up to about 50% by weight of the copolymer to form a damp moldable mixture containing from about 0.15 to about 3% by weight based on the sand of said copolymer, shaping said mixture and heating said shaped mixture at a temperature of 200 to 350° F. to drive off water and harden said shaped mixture.

References Cited in the file of this patent

UNITED STATES PATENTS

| | | |
|---|---|---|
| 2,331,805 | Scrutchfield | Oct. 12, 1943 |
| 2,362,507 | Steinbock | Nov. 14, 1944 |
| 2,466,667 | Thomas | Apr. 12, 1949 |
| 2,467,341 | Seymour | Apr. 12, 1949 |
| 2,521,614 | Valyi | Sept. 5, 1950 |
| 2,534,743 | Vincent | Dec. 19, 1950 |
| 2,682,692 | Kohl | July 6, 1954 |

FOREIGN PATENTS

| | | |
|---|---|---|
| 411,860 | Great Britain | June 13, 1934 |
| 593,845 | Great Britain | Oct. 28, 1947 |

OTHER REFERENCES

The Washington Post, October 19, 1950, page 3, right-hand column, "Soil Treatment Digest."

UNITED STATES PATENT OFFICE

Certificate of Correction

Patent No. 2,765,507 October 9, 1956

Robert J. Wolf et al.

It is hereby certified that error appears in the printed specification of the above numbered patent requiring correction and that the said Letters Patent should read as corrected below.

Column 3, line 60, for "acryic" read —acrylic—; column 8, *Table II*, under the heading "162.5 AFS—N. J." for "28.2" read —28.0—, and for "24.0" read —24.2—; column 10, between lines 57 and 58, insert —EXAMPLE 7—; column 11, line 1, strike out "EXAMPLE 7—."

Signed and sealed this 10th day of December 1957.

[SEAL]

Attest:
KARL H. AXLINE,
*Attesting Officer.*

ROBERT C. WATSON,
*Commissioner of Patents.*